(12) United States Patent
Abelha Ferreira et al.

(10) Patent No.: US 11,625,616 B2
(45) Date of Patent: Apr. 11, 2023

(54) LOCALITY-AWARE COMPRESSOR-DECOMPRESSOR FOR KEEPING PREDICTION MODELS UP-TO-DATE IN RESOURCE CONSTRAINED NETWORKS

(71) Applicant: EMC IP Holding Company LLC, Hopkinton, MA (US)

(72) Inventors: Paulo Abelha Ferreira, Rio de Janeiro (BR); Adriana Bechara Prado, Niterói (BR); Pablo Nascimento da Silva, Niterói (BR); Tiago Salviano Calmon, Rio de Janeiro (BR)

(73) Assignee: EMC IP Holding Company LLC, Hopkinton, MA (US)

( * ) Notice: Subject to any disclaimer, the term of this patent is extended or adjusted under 35 U.S.C. 154(b) by 403 days.

(21) Appl. No.: 16/859,746

(22) Filed: Apr. 27, 2020

(65) Prior Publication Data
US 2021/0334668 A1    Oct. 28, 2021

(51) Int. Cl.
*G06N 5/02* (2006.01)
*G06N 20/00* (2019.01)
*H04W 72/08* (2009.01)
*H04W 52/26* (2009.01)

(52) U.S. Cl.
CPC ............... *G06N 5/02* (2013.01); *G06N 20/00* (2019.01); *H04W 52/265* (2013.01); *H04W 72/085* (2013.01)

(58) Field of Classification Search
CPC .. G06N 5/02; G06N 20/00; G06F 2209/5015; H04W 72/085; H04W 52/265
See application file for complete search history.

(56) References Cited

U.S. PATENT DOCUMENTS

2019/0349266 A1*  11/2019  Johnsson ............... H04L 41/147
2020/0327371 A1*  10/2020  Sharma .................... G06N 5/04

OTHER PUBLICATIONS

Yoshua Bengio et al.; "Representation Learning: A Review and New Perspectives"; arXiv:1206.5538v3 [cs.LG]; Apr. 23, 2014.

* cited by examiner

*Primary Examiner* — Ellen Tran
(74) *Attorney, Agent, or Firm* — Chamberlain, Hrdlicka, White, Williams & Aughtry

(57) ABSTRACT

A global prediction manager for generating predictions using data from data zones includes storage for storing a model repository comprising a global model set and a prediction manager. The prediction manager obtains a local model set from a data zone of the data zones indicating that the global model set is unacceptable; makes a determination that the local model set is acceptable; in response to the determination: distributes the local model set to at least one second data zone of the data zones; obtains compressed telemetry data, that was compressed using the local model set, from the data zone and the at least one second data zone; and generates a global prediction regarding a future operating condition of the data zones using: the compressed local telemetry data and the local model set.

20 Claims, 9 Drawing Sheets

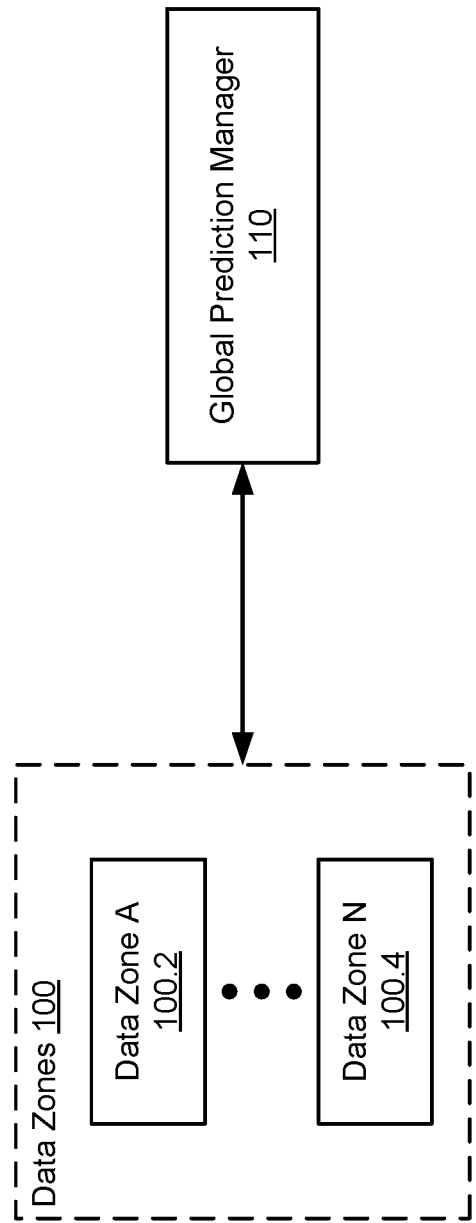
FIG. 1.1

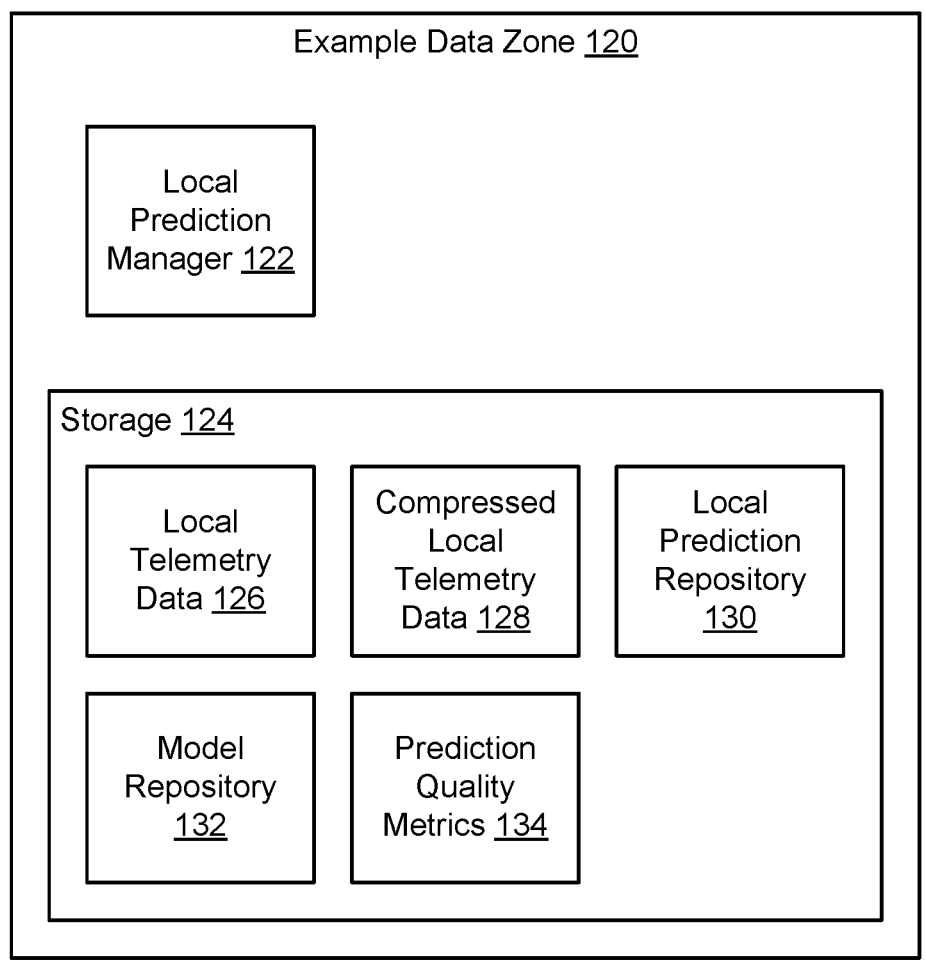
FIG. 1.2

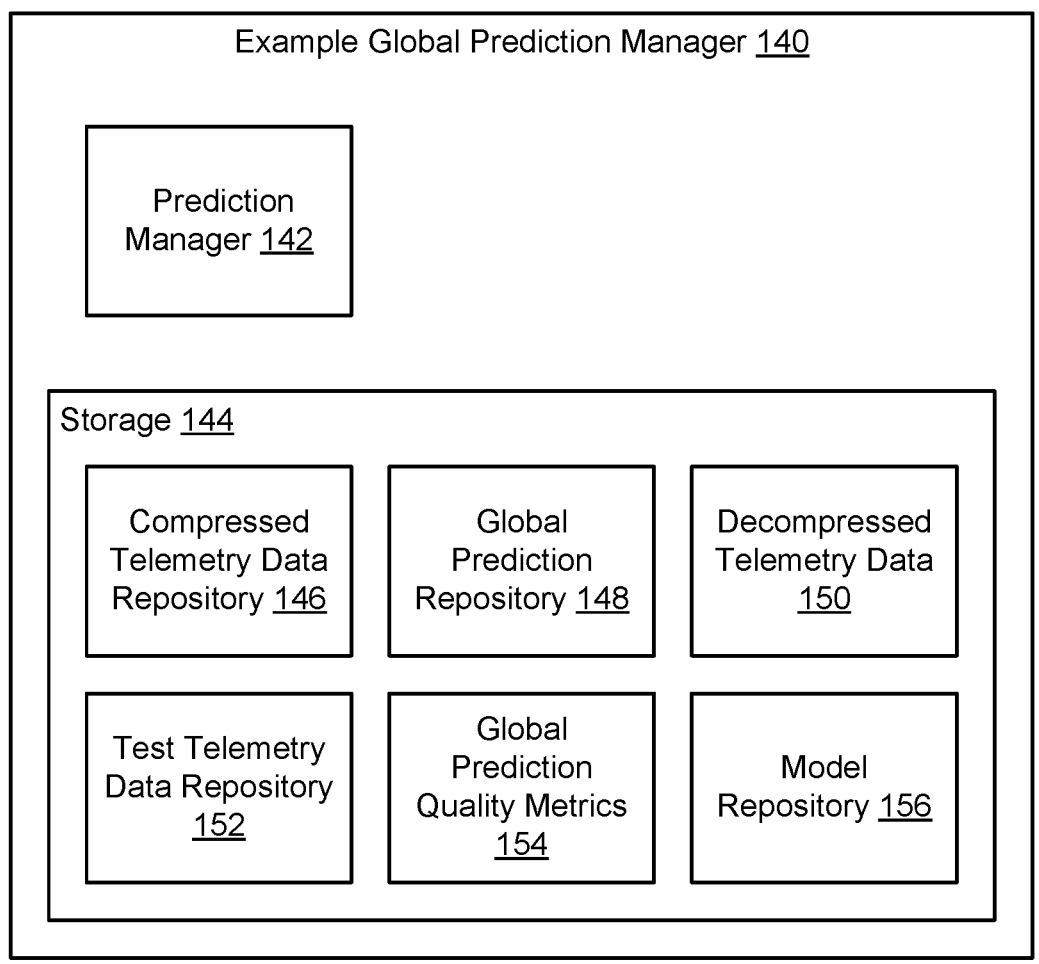
FIG. 1.3

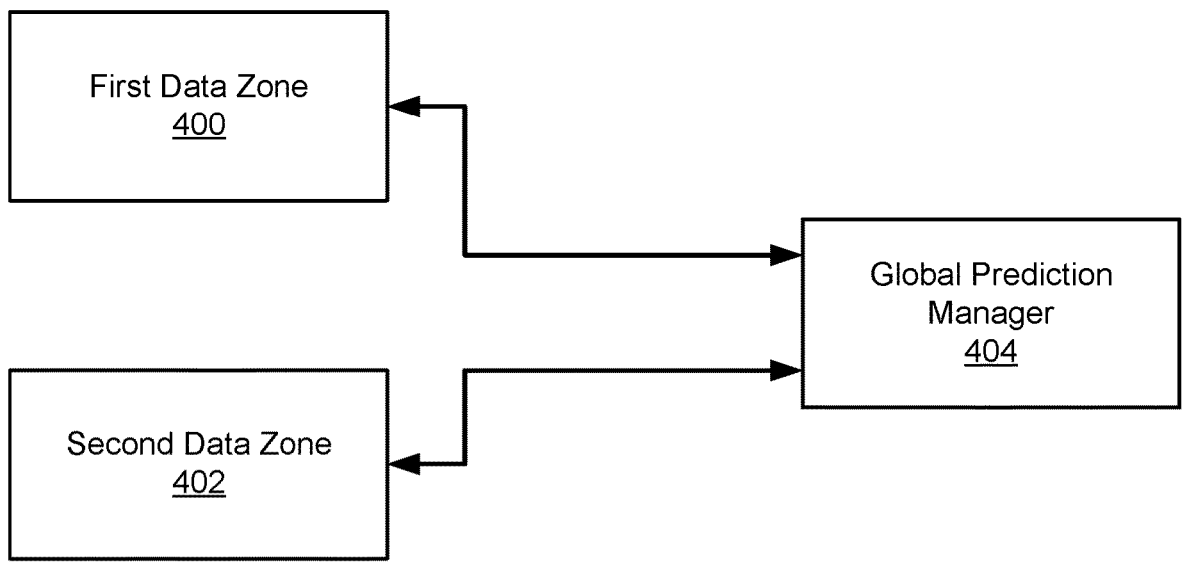
FIG. 4.1

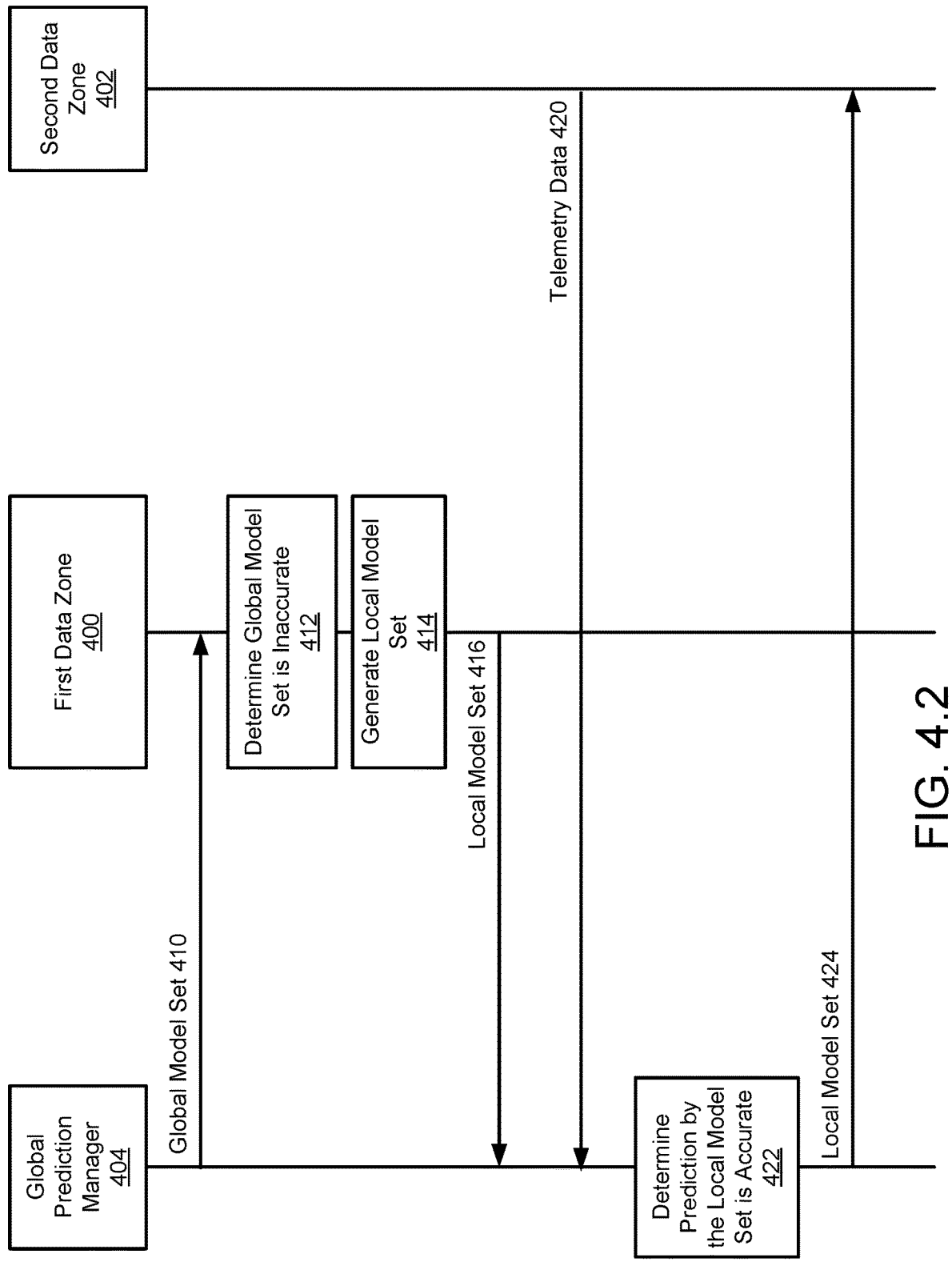
FIG. 4.2

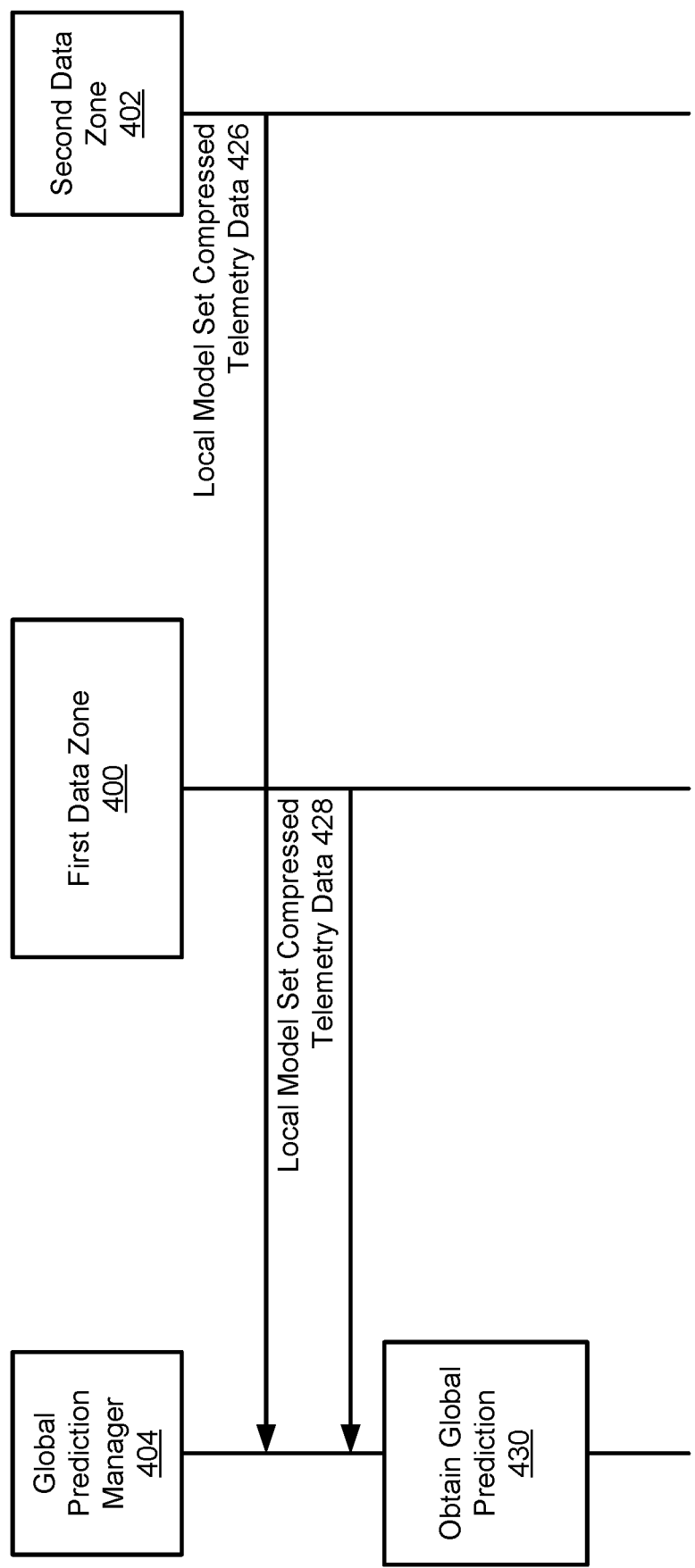

LOCALITY-AWARE COMPRESSOR-DECOMPRESSOR FOR KEEPING PREDICTION MODELS UP-TO-DATE IN RESOURCE CONSTRAINED NETWORKS

BACKGROUND

Multiple computing devices may cooperate to provide computer implemented services. The ability of the computing devices to provide the computer implemented services may be limited by the computational resources available to the computing devices.

SUMMARY

In one aspect, a global prediction manager for generating predictions using data from data zones in accordance with one or more embodiments of the invention includes storage for storing a model repository comprising a global model set and a prediction manager. The prediction manager obtains a local model set from a data zone of the data zones indicating that the global model set is unacceptable; makes a determination that the local model set is acceptable; in response to the determination: distributes the local model set to at least one second data zone of the data zones; obtains compressed telemetry data, that was compressed using the local model set, from the data zone and the at least one second data zone; and generates a global prediction regarding a future operating condition of the data zones using: the compressed local telemetry data and the local model set.

In one aspect, a method for generating predictions using data from data zones in accordance with one or more embodiments of the invention includes obtaining a local model set from a data zone of the data zones indicating that a global model set using to generate the predictions is unacceptable; making a determination that the local model set is acceptable; in response to the determination: distributing the local model set to at least one second data zone of the data zones; obtaining compressed telemetry data, that was compressed using the local model set, from the data zone and the at least one second data zone; and generating a global prediction regarding a future operating condition of the data zones using: the compressed local telemetry data and the local model set.

In one aspect, a non-transitory computer readable medium in accordance with one or more embodiments of the invention includes computer readable program code, which when executed by a computer processor enables the computer processor to perform a method for generating predictions using data from data zones. The method includes obtaining a local model set from a data zone of the data zones indicating that a global model set using to generate the predictions is unacceptable; making a determination that the local model set is acceptable; in response to the determination: distributing the local model set to at least one second data zone of the data zones; obtaining compressed telemetry data, that was compressed using the local model set, from the data zone and the at least one second data zone; and generating a global prediction regarding a future operating condition of the data zones using: the compressed local telemetry data and the local model set.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 1.1 shows a diagram of a system in accordance with one or more embodiments of the invention.

FIG. 1.2 shows a diagram of a data zone in accordance with one or more embodiments of the invention.

FIG. 1.3 shows a diagram of a global prediction manager in accordance with one or more embodiments of the invention.

FIG. 4.1 shows a diagram of a non-limiting example of a system in accordance with embodiments of the invention.

FIGS. 4.2-4.3 show diagrams of interactions between and actions performed by components of the example system of FIG. 4.1 over time.

DETAILED DESCRIPTION

Figure 2:
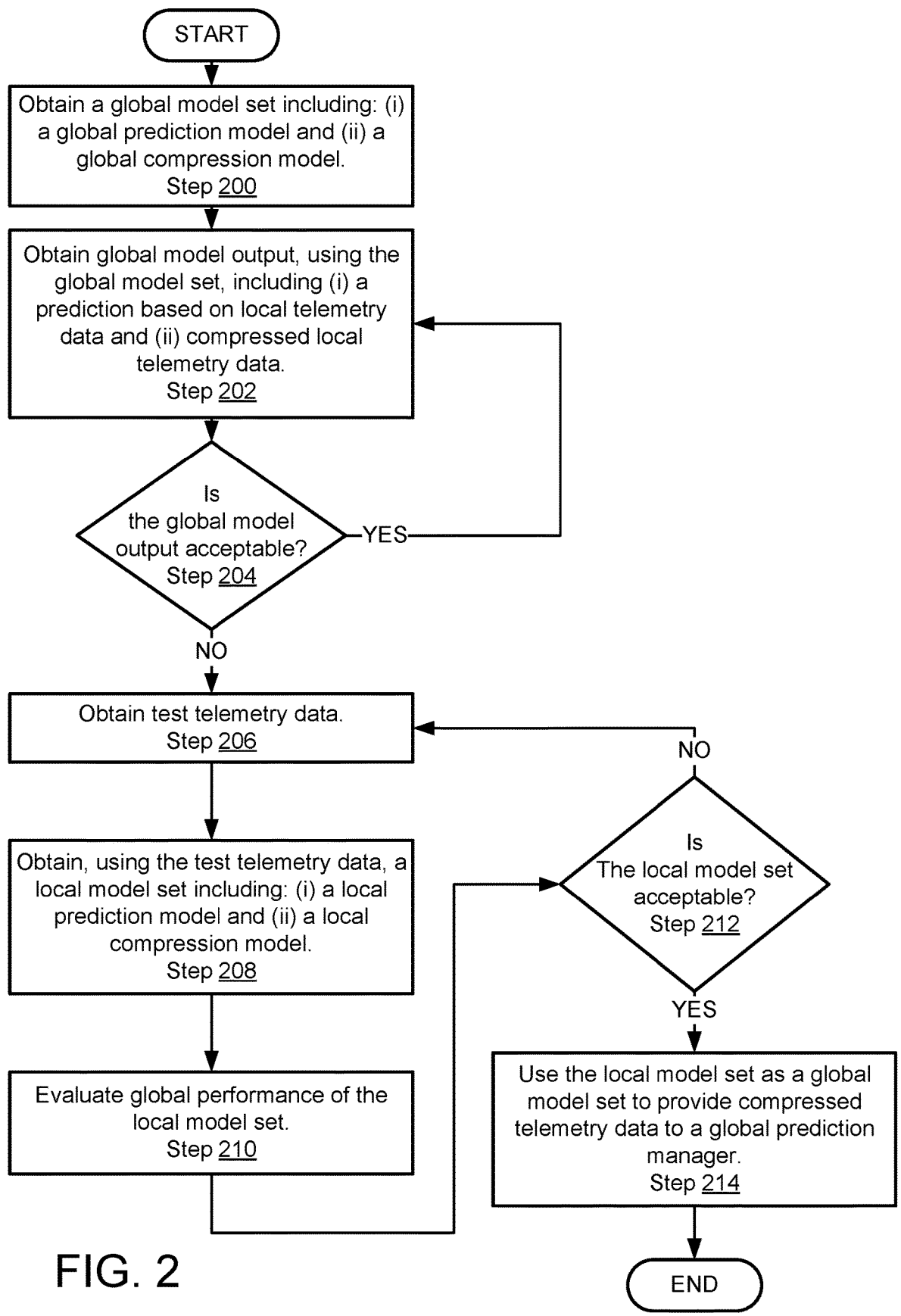
FIG. 2 shows a flowchart of a method of facilitating management of data zones in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to systems, devices, and methods for managing data zones. A data zone may be a collection of computing devices that may cooperatively provide one or more functionalities. Each of the computing devices may have a limited quantity of computing resources for providing the functionalities.

To facilitate management of the data zones, the system may include a global prediction manager. The global prediction manager may predict likely operating conditions that the computing devices will face in the future. The global prediction manager may utilize the aforementioned predictions to manage the operations of the data zones so that the data zones are better able to provide their functionalities in view of the likely future operating conditions.

To generate the predictions, data from the data zones may need to be aggregated in a single location (e.g., in the global prediction manager). The computational cost of doing so may impede the ability of the data zones to provide their other functionalities and/or doing so may be otherwise financially costly or cost prohibitive.

To reduce the quantity of data to be aggregated, the data zones may compress the data before providing the data to the global prediction manager. In one or more embodiments of the invention, the data zones compress the data using lossy compression thereby introducing error into data provided to the global prediction manager. To mitigate negative impacts introduced by the inclusion of inaccurate information in the data, the method of compressing the data may be optimized in conjunction with a predictive model for generating predictions using the data. Thus, each of the data zones may compress data in a manner consistent with a method of generating predictions implemented by the global prediction manager.

Over time, the operating conditions of any of the data zones may change. Consequently, the prediction model utilized by the global prediction manager may become inaccurate.

To reduce the impact of inaccurate predictions, each of the data zones may evaluate the accuracy of the predictions using only their local data (rather than data aggregated from multiple data zones). If a data zone determines that a prediction is likely inaccurate, the data zone may take action to improve the accuracy of the predictions.

To do so, the data zone may generate a new model (e.g., a prediction model and corresponding compression model for data transmission/aggregation) used to generate predictions based solely on its local data. Once generated, the new model may be evaluated to ascertain whether other data zones should adopt the new model or continue to use the global model currently being utilized for generating predictions.

If the new model is to be adopted, copies of the new model may be provided to any number of data zones. Consequently, each of the data zones may compress data used to generate predictions in a manner consistent with that utilized by the global prediction manager to generate predictions.

By doing so, the computational cost for (i) generating predictions and (ii) evaluating whether models used to generate predictions are accurate. Consequently, data zones of the systems may be better able to provide their other functionalities by marshaling more computing resources for providing those functionalities.

FIG. 1.1 shows an example system in accordance with one or more embodiments of the invention. The system may include data zones (100) that provide computer implemented services. The computer implemented services provided by each of the data zones (e.g., 100.2, 100.4) may be similar to and/or different from computer implemented services provided by other data zones. Each data zone may provide any type and quantity of computer implemented services.

The ability of the data zones (100) to provide their respective computer implemented services may depend on the type and quantity of computing resources available to the data zones (100) to provide the computer implemented services as well as the specific type of computer implemented services being provided by the data zones (100). For example, some computer implemented services may rely on storing data in persistent storage. In such cases, the quality of the computer implemented services may depend on the capabilities (e.g., available storage, rate to store data, rate to provide previously stored data, etc.) of the persistent storage.

Additionally, overtime the use of computing resources for providing any type of computer implemented service may change thereby resulting in changes in the quality of the computer implemented services provided by the respective data zones. Applications (which may provide all, or a portion, of the computer implemented services) may encounter a change in use by users of a computer implemented service which changes the manner in which the applications that provide the computer implemented service utilize computing resources to provide the service. For example, a user that previously used a data zone to store few, large files may start to store many small files using the data zones. In such a scenario, the access times (e.g., a characteristic of the computing resources of a data zone) to read/write to persistent storage may become the primary factor (in contrast to, for example, sequential write rates) in determining the quality of the computer implemented service provided by the data zones.

To improve the quality of computer implemented services provided by data zones (100) and/or provide other benefits, embodiments of the invention may provide a system and method for predicting the quality of computing implemented services provided by data zones (100). To do so, a system in accordance with embodiments of the invention may include a global prediction manager (110).

The global prediction manager (110) may generate predictions based on information obtained from one or more of the data zones (100). The predictions may be used to, for example, modify the operation of one or more of the data zones (100) to improve the ability of the data zones to provide computer implemented services.

For example, the global prediction manager (110) may obtain telemetry data from one or more of the data zones (100). The telemetry data may include any type and quantity of information regarding, for example, the previous use and quality of computer implemented services, the previous use of computer computing resources (e.g., processor cycle use, memory space use, storage space use, access patterns for storage, etc.), and/or other types of information that may be used to predict the quality of computer implemented service, use of computing resources, and/or other characteristics of the data zones (100).

Using the aforementioned telemetry data, the global prediction manager (110) may, for example, determine that a first data zone (e.g., 100.2) is likely to provide poor quality computer implemented services in the future based on likely future change in storage utilization. In such a scenario, the global prediction manager (110) may take action to prevent the poor-quality computer implemented services from being provided. The actions may include, for example, (i) modifying the operation of the data zones, (ii) notifying administrators of the data zones of the likely poor future computer implemented services, and/or (iii) perform other actions that may be used to proactively remediate negative outcomes from the predictions.

To generate the predictions, the global prediction manager (110) may need to obtain data from one or more of the data zones (100). However, doing so may be computationally costly. For example, the global prediction manager (110) may be geographically separated from one or more of the data zones (100). In such a scenario, the data from the data zones (100), used to generate the predictions, may need to be transmitted to the global prediction manager (110) through one or more networks (e.g., the Internet) which may be computationally and economically costly.

To reduce the quantity of data to be transmitted to the global prediction manager (110), the system of FIG. 1.1 may utilize compression. Specifically, the data zones (100) may compress data before transmitting it to the global prediction manager (110). In one or embodiments of the invention, the data zones (100) compress the data using lossy compression (i.e., compression that results in compressed data that cannot be perfectly uncompressed). Lossy compression may enable the data (e.g., telemetry data) to be reduced in size when compared to using lossless compression. However, using lossy compression may result in errors when the compressed data is decompressed by the global prediction manager (110) and used to generate a prediction by virtue of the errors introduced into the uncompressed data.

To reduce the susceptibility of the system of FIG. 1.1 to errors introduced by compression, the system may utilize prediction models and compression models that are trained simultaneously using a global optimization function. By doing so, the resulting prediction models may be capable of generating predictions based on compressed data and/or uncompressed data in a manner that is tolerant of the errors (e.g., data loss) introduced when data (e.g., telemetry data) is compressed.

In the resulting system, the data zones (100) of FIG. 1.1 may utilize compression models that have been trained in conjunction with the prediction model utilized by the global prediction manager (110) to generate predictions.

However, as noted above, overtime the use of computer implemented services, computing resources, etc. of the data zones (100) may change. These changes may result in both the compression models and prediction models from no longer being able to generate accurate predictions (e.g., a model becoming stale). Further, by virtue of each of the data zones (100) operating independently, the compression models and predictions models may only become stale with respect to a subset of the data zones (100).

For example, consider a scenario where a system includes three data zones. At a first point in time, all three data zones may be predominantly providing database services. A global prediction manager (110) may generate predictions regarding whether each of the data zones will be able to provide their respective computer implemented services in the future.

At a second point in time, one of the data zones may begin to predominantly provide backup services. Backup services may have different access patterns with respect to storage of the data zones. Consequently, the global prediction manager (110) may no longer (based on the currently used models) be capable of accurately predicting whether the data zone now predominately providing backup services will be capable of provide its computer implemented services.

To address the above scenario, a system in accordance with embodiments of the invention may implement a distributed prediction generation error detection method. The distributed prediction generation error detection method may include (i) testing the accuracy of both compression and prediction models in a data zone based on local data, (ii) if the testing indicates that the current compression and/or prediction model is inaccurate, generating a new model set (e.g., a compression model and a prediction model trained in view of each other), (iii) distributing the new model set for potential adoption by other data zones.

By doing so, embodiments of the invention may provide a method and system for improving the operation of data zones. By improving the operation of the data zones based on predictions, the system may provide computer implemented services of a better quality than those that might be provided without utilizing predictions to manage the operation of the data zones (e.g., 100).

The components of the system illustrated in FIG. 1.1 may be operably connected to each other and/or operably connected to other entities (not shown) via any combination of wired and/or wireless networks. Each component of the system illustrated in FIG. 1.1 is discussed below.

The data zones (100) may be implemented using computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions described in this application and/or all, or a portion, of the methods illustrated in FIGS. 2-3. The data zones (100) may be implemented using other types of computing devices without departing from the invention. For additional details regarding computing devices, refer to FIG. 5.

The data zones (100) may be implemented using logical devices without departing from the invention. For example, the data zones (100) may be implemented using virtual machines that utilize computing resources of any number of physical computing devices to provide the functionality of the data zones (100). The data zones (100) may be implemented using other types of logical devices without departing from the invention.

In one or more embodiments of the invention, the data zones (100) provide computer implemented services. For example, the data zones (100) may provide database services, electronic communication services, file storage services, or any other types of computer implemented services. Each of the data zones (100) may provide any number of types and/or quantities of computer implemented services. Different data zones may provide similar and/or different computer implemented services. The system of FIG. 1.1 may include any number of data zones.

To facilitate improvements of the quality of computer implemented services, the data zones (100) may cooperate with the global prediction manager (110) to generate predictions. To do so, the data zones may (i) obtain data for use in prediction generation, (ii) compress the data, (iii) provide the compressed data to the global prediction manager (110), and/or (iv) implement changes in their operation provided by the global prediction manager (110). Additionally, the data zones may test whether the models (e.g., compression and prediction) used to generate predictions are accurate. If the respective data zones determine that a model is inaccurate, the data zones may generate new models and distribute them (e.g., provide a copy to the global prediction manager (110) for potential adoption by other data zones. For additional details regarding data zones, refer to FIG. 1.2.

The global prediction manager (110) may be implemented using computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions described in this application and/or all, or a portion, of the methods illustrated in FIGS. 2-3. The global prediction manager (110) may be implemented using other types of computing devices without departing from the invention. For additional details regarding computing devices, refer to FIG. 5.

The global prediction manager (110) may be implemented using logical devices without departing from the invention. For example, the global prediction manager (110) may be implemented using virtual machines that utilize computing resources of any number of physical computing devices to provide the functionality of the global prediction manager (110). The global prediction manager (110) may be implemented using other types of logical devices without departing from the invention.

In one or more embodiments of the invention, the global prediction manager (110) provides prediction generation services. Prediction generation services may include (i) training models sets (e.g., compression/decompression and prediction models trained in view of each other) used to generate predictions, (ii) obtaining data upon which the predictions are generated from one or more of the data zones, (iii) generate the predictions using the model sets and the obtained data (e.g., telemetry data), (iv) take action based on predictions to improve the computer implemented services provided by the data zones, (v) evaluate model sets obtained from data zones when one or more of the data zones determines that a model set is inaccurate, and/or (vi) distribute model sets obtained from the data zones if it is determined that the obtained model sets are of higher accuracy than a currently employed model set. For additional details regarding global prediction managers, refer to FIG. 1.3.

While the system of FIG. 1.1 has been described and illustrated as including a limited number of components for the sake of brevity, a system in accordance with embodiments of the invention may include additional, fewer, and/or different components than those illustrated in FIG. 1.1 without departing from the invention.

As discussed above, the data zones (100) may provide computer implemented services. FIG. 1.2 shows a diagram of an example data zone (120) in accordance with one or more embodiments of the invention. The example data zone (120) may be similar to any of the data zones (e.g., 100.2, 100.4) discussed with respect to FIG. 1.1. As discussed above, the example data zone (120) may provide computer implemented services.

To provide the aforementioned functionality of the example data zone (120), the example data zone (120) may include a local prediction manager (122) and storage (124). Each component of the example data zone (120) is discussed below.

In one or more embodiments of the invention, the local prediction manager (122) is implemented using a hardware device including circuitry. The hardware device may be, for example, a digital signal processor, a field programmable gate array, or an application specific integrated circuit. The local prediction manager (122) may be implemented using other types of hardware devices without departing from the invention.

In one or more embodiments of the invention, the local prediction manager (122) is implemented using computing code stored on a persistent storage that when executed by a processor performs the functionality of the local prediction manager (122). The processor may be a hardware processor including circuitry such as, for example, a central processing unit or a microcontroller. The processor may be implemented using other types of hardware devices for processing digital information without departing from the invention.

In one or more embodiments of the invention, the local prediction manager (122) provides (i) global prediction support services and (ii) model evaluation services. Global prediction support services may include (a) obtaining local telemetry data (126), (b) compressing the local telemetry data using a compression model to obtained compressed local telemetry data (128), (c) providing the compressed local telemetry data to a global prediction manager, (d) obtaining modifications to its manner of operation from the global prediction manager, and (e) implementing the modifications. By providing global prediction support services, the quality of computer implemented services provided by, for example, application (not shown) hosted by the example data zone (120) may be improved by modifying its operation based on predictions generated by the global prediction manager.

Model evaluation services may include (a) generating predictions using a prediction model associated with a compression model used to provide the global prediction support services, (b) evaluating the performance of the prediction model based on the generated predictions (e.g., comparing the predictions to reality), (c) generating new model sets (e.g., compression and prediction models trained in view of each other, for additional details regarding training model sets refer to the discussion with respect to FIG. 1.3) by training then using only the local telemetry data (e.g., 126) obtained by the example data zone (120), and (c) distributing the new model sets for potential adoption by other data zones. By doing so, the computer implemented services may be improved by improving the accuracy of predictions upon which changes to the data zones are made to improve the quality of the provided computer implemented services.

In one or more embodiments disclosed herein, the storage (124) is implemented using devices that provide data storage services (e.g., storing data and providing copies of previously stored data). The devices that provide data storage services may include hardware devices and/or logical devices. For example, storage (124) may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage (124) may include a memory device (e.g., a dual in line memory device) in which data is stored and from which copies of previously stored data are provided. In another example, storage (124) may include a persistent storage device (e.g., a solid-state disk drive) in which data is stored and from which copies of previously stored data is provided. In a still further example, storage (124) may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

The storage (124) may store data structures including local telemetry data (126), compressed local telemetry data (128), a local prediction repository (130), a model repository (132), and prediction quality metrics (134). Each of these data structures is discussed below.

The local telemetry data (126) may be one or more data structures that include information upon which predictions are generated. For example, the local telemetry data (126) may include information regarding (i) the quality of computer implemented services (e.g., responsiveness, successful completion, etc.) provided by the example data zone (120) over time, (ii) use of computing resources (e.g., storage access patterns over time) of the example data zone (120) over time, and/or other types of information that may be used to relate the current and/or past condition of the example data zone (120) to its ability to provide computer implemented services (and/or other services) in the future.

The compressed local telemetry data (128) may be one or more data structures that include a compressed version of all, or a portion, of the local telemetry data (126). The compressed local telemetry data (128) may be compressed using lossy compression to reduce the total quantity of data to be provided to a global prediction manager to generate predictions. The compressed local telemetry data (128) may be generated using a compression model stored in the model repository (132).

The local prediction repository may be one or more data structures that include predictions generated by prediction models stored in the model repository (132). For example, prediction models generated by the global prediction manager, the example data zone (120), and/or other data zones may be used to generate the predictions stored in the local prediction repository (130). The predictions may be generated by using local telemetry data (e.g., 126) over a first period of time to generate a prediction over a second period of time (i.e., a future period of time).

The model repository (132) may be one or more data structures that include model sets. The model repository (132) may include any number of model sets. The model sets may be obtained from any of the sources as discussed with respect to the local prediction repository. At least one of the model sets may be an untrained model set (e.g., a model set that has not been trained using telemetry data). The untrained model set may be utilized by the local prediction manager (122) to generate a trained model set when the local prediction manager (122) determines that a currently used, trained model set is generating inaccurate predictions.

The prediction quality metrics (134) may be one or more data structures that include information regarding the quality of predictions generated using trained model sets. The prediction quality metrics (134) may include any type and quantity of information that describes the relative accuracy of the predictions generated by a trained model set in comparison to the actual condition that occurred which was predicted by the prediction.

While the data structures stored in storage (124) have been described as including a limited amount of specific information, any of the data structures stored in storage (124) may include additional, less, and/or different information without departing from the embodiments disclosed herein. Further, the aforementioned data structures may be combined (with each other and/or other data structures), subdivided into any number of data structures, may be stored in other locations (e.g., in a storage hosted by another device), and/or spanned across any number devices without departing from the embodiments disclosed herein.

While the example data zone (120) has been described and illustrated as including a limited number of components for the sake of brevity, a data zone in accordance with embodiments of the invention may include additional, fewer, and/or different components than those illustrated in FIG. 1.2 without departing from the invention.

As discussed above, the global prediction manager (110, FIG. 1.1) may provide data zone management services. FIG. 1.3 shows a diagram of an example global prediction manager (140) in accordance with one or more embodiments of the invention. The example global prediction manager (140) may be similar to the global prediction manager (110) discussed with respect to FIG. 1.1. As discussed above, the example global prediction manager (140) may provide data zone management services by generating and utilize predictions regarding the operation of the data zones to manage the data zones.

To provide the aforementioned functionality of the example global prediction manager (140), the example global prediction manager (140) may include a prediction manager (142) and storage (144). Each component of the example global prediction manager (140) is discussed below.

In one or more embodiments of the invention, the prediction manager (142) is implemented using a hardware device including circuitry. The hardware device may be, for example, a digital signal processor, a field programmable gate array, or an application specific integrated circuit. The prediction manager (142) may be implemented using other types of hardware devices without departing from the invention.

In one or more embodiments of the invention, the prediction manager (142) is implemented using computing code stored on a persistent storage that when executed by a processor performs the functionality of the prediction manager (142). The processor may be a hardware processor including circuitry such as, for example, a central processing unit or a microcontroller. The processor may be implemented using other types of hardware devices for processing digital information without departing from the invention.

In one or more embodiments of the invention, the prediction manager (142) provides (i) prediction generation services and (ii) model evaluation services. Prediction generation services may include (a) obtaining compressed telemetry data (e.g., stored in a repository (e.g., 146)) from any number of data zones, (b) generating predictions using the compressed telemetry data (and/or decompressed telemetry data) as input to a trained prediction model, and/or (c) performing an action set based on the predictions to modify the operation of one or more of the data zones. By providing prediction generation services, the quality of computer implemented services provided by, for example, application (not shown) hosted by data zones may be improved by modifying the operation of the data zones based on predictions.

Model evaluation services may include (a) obtaining a model set generated by a data zone (e.g., a model set that was trained using only the telemetry data of the data zone that generated the model), (b) generating predictions using the obtained model set using telemetry data from one or more data zones that did not generate the model set, (c) evaluating the performance of the model set based on the generated predictions (e.g., comparing the predictions to reality), and/or (d) distributing the new model sets to other data zones for adoption if the model sets produce more accurate predictions than other model sets (e.g., the currently used model set). By doing so, the computer implemented services may be improved by improving the accuracy of predictions upon which changes to the data zones are made to improve the quality of the provided computer implemented services.

In one or more embodiments of the invention, the model sets are implemented using machine learning (or other types of learning models) models. The machine learning models may be trained using, as input, telemetry data obtained by one data zone (e.g., when a model set is trained by a data zone) or multiple data zones (e.g., when a model set is trained by a global prediction manager that has aggregated telemetry data from multiple data zones).

In one or more embodiments of the invention, a model set includes both a compression/decompression model and a prediction model. The compression/decompression model may take, as input, telemetry data. The prediction model may take, as input, compressed and/or decompressed telemetry data. The aforementioned models may be trained simultaneously using a function (i.e., an objective function) that optimizes the accuracy of both the compression/decompression model as well as the prediction model.

For example, the function may specify the quality of the combined models as being the sum of (i) the difference between the telemetry data used as input to the compression/decompression model and the output generated by the trained compression/decompression model and (ii) the difference between the actual condition and the predicted condition generated by the prediction model using the telemetry data as the input to the prediction model. The lower the value, the better the optimization value.

In one or more embodiments disclosed herein, the storage (144) is implemented using devices that provide data storage services (e.g., storing data and providing copies of previously stored data). The devices that provide data storage services may include hardware devices and/or logical devices. For example, storage (144) may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage (144) may include a memory device (e.g., a dual in line memory device) in which data is stored and from which copies of previously stored data are provided. In another example, storage (144) may include a persistent storage device (e.g., a solid-state disk drive) in which data is stored and from which copies of previously stored data is provided. In a still further example, storage (144) may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

The storage (144) may store data structures including a compressed telemetry data repository (146), a global prediction repository (148), decompressed telemetry data (150), a test telemetry data repository (152), global prediction quality metrics, and a model repository (156). Each of these data structures is discussed below.

The compressed telemetry data repository (146) may be one or more data structures that include any quantity of compressed telemetry data obtained from any number of data zones.

The global prediction repository (148) may be one or more data structures that include predictions generated by prediction models stored in the model repository (156). For example, prediction models generated by the prediction manager (142) and/or data zones may be used to generate the predictions stored in the global prediction repository (148). The predictions may be generated by using compressed telemetry data over a first period of time and obtained from any number of data zones to generate a prediction over a second period of time (i.e., a future period of time).

The decompressed telemetry data (150) may be one or more data structures that includes telemetry data from the compressed telemetry data repository (146) that has been decompressed. The telemetry data may be decompressed using a trained compression/decompression model from the model repository (156).

The test telemetry data repository (152) may be one or more data structures including telemetry information used to ascertain the accuracy of predictions generated by one or more model sets stored in the model repository (156). For example, the test telemetry data repository (152) may include telemetry data associated with a first period of time that could be used to predict the condition of the data zone during a second period of time. The test telemetry data repository (152) may also include the actual condition of the data zone during the second period of time. Accordingly, the telemetry data of the test telemetry data repository (152) may be used as input to a trained model set to generate a prediction, which may be compared against the actual condition included in the test telemetry data repository (152).

The global prediction quality metrics (154) may be one or more data structures that include information regarding the quality of predictions generated using trained model sets. For example, when a model set is obtained from a data zone, test telemetry data may be obtained from second data zone. The test telemetry data may then be used to evaluate the performance of the obtained model set with respect to the conditions in the second data zone. The global prediction quality metrics (154) may include any type and quantity of information that describes the relative accuracy of the predictions generated by a trained model set in comparison to the actual condition that occurred which was predicted by the prediction. The global prediction quality metrics (154) may be used to determine whether to provide the obtained model set to any number of other data zones for adoption (e.g., if the obtained model set provides higher accuracy predictions than a currently used model set).

While the data structures stored in storage (144) have been described as including a limited amount of specific information, any of the data structures stored in storage (144) may include additional, less, and/or different information without departing from the embodiments disclosed herein. Further, the aforementioned data structures may be combined (with each other and/or other data structures), subdivided into any number of data structures, may be stored in other locations (e.g., in a storage hosted by another device), and/or spanned across any number devices without departing from the embodiments disclosed herein.

While the example global prediction manager (140) has been described and illustrated as including a limited number of components for the sake of brevity, a global prediction manager in accordance with embodiments of the invention may include additional, fewer, and/or different components than those illustrated in FIG. 1.2 without departing from the invention.

Any of the data structures illustrated in FIGS. 1.2-1.3 may be implemented using, for example, lists, linked lists, tables, databases, and/or other types of data structures. Any of the data structures illustrated in FIGS. 1.2-1.3 may be maintained by the entities hosting the data structures. Maintaining a data structure may include, for example, obtaining information to be added to the data structures, removing stale information from the data structures, migrating the data structures between storage locations, and/or otherwise adding information to and/or removing information from the data structures to make the data structures more usable for their intended purposes. Any of the active components of FIGS. 1.2-1.3 may maintain the respective data structures without departing from the invention.

Returning to FIG. 1.1, the data zones may facilitate their management by a global prediction manager by generating new model sets for use in generating predictions. FIG. 2 illustrates a method that may be performed by data zones of the system of FIG. 1.1 to facilitate data zone management.

FIG. 2 shows a flowchart of a method in accordance with one or more embodiments of the invention. The method depicted in FIG. 2 may be used to facilitate management of data zones in accordance with one or more embodiments of the invention. The method shown in FIG. 2 may be performed by, for example, a data zone (e.g., 100.2, FIG. 1.1). Other components of the system illustrated in FIG. 1.1 may perform all, or a portion, of the method of FIG. 2 without departing from the invention.

While FIG. 2 is illustrated as a series of steps, any of the steps may be omitted, performed in a different order, additional steps may be included, and/or any or all of the steps may be performed in a parallel and/or partially overlapping manner without departing from the invention.

In step 200, a global model set is obtained. The global model set may include a global prediction model and a global compression model.

In one or more embodiments of the invention, the global model set is generated by a global prediction manager. To generate the global model set, the global prediction manager may train each model of the global model set using telemetry data obtained from multiple data zones.

The global model set may include a compression model, usable to compress telemetry data; a decompression model, usable to decompress compressed telemetry data; and a predictive model, usable to predict to generate a prediction regarding the future. In contrast, the compression and decompression models may be usably to compress data in a lossy manner and decompress the compressed data in a manner that reduces the error in the decompressed data to an acceptable level. The level of error in introduced may be optimized in conjunction with the predictive ability of the predictive model to obtain a model set that (i) introduces an acceptable level of error during lossy compression, (ii) provides a prediction that may be based on compressed or decompressed data, and/or) provide a predictive model that is tolerant to the error introduced during lossy compression of telemetry data.

The models of the global models may be trained to be used in conjunction with one another. In other words, the models may be simultaneously trained using the same data set (i.e., telemetry data obtained from one or more data zones). For example, a global objective function reflecting the predictive accuracies of each of the models of the global model set may be used. The value of the objective function may reflect when all of the individual predictive performance of each of the models of the global model set is maximized. In some embodiments of the invention, weighting coefficients may be used to preferentially weight the accuracies of the compression model, decompression model, and/or predictive model.

The global model set may be obtained by receiving the global model set in a message. The global model set may be obtained via other methods without departing from the invention. For example, a data zone may read the global model set from a predetermined storage location.

In step 202, model output is obtained using the global model set. The global model output may include a prediction based on local telemetry data. The global model output may also include compressed local telemetry data.

The global model output may be obtained by using, as input, the local telemetry data to one or more of the models of the global model set. For example, the local telemetry data may be used as input to the compression model. The compressed data may then be used as input to the decompression model. Similarly, the telemetry data or compressed data may be used as input to a predictive model depending on how the predictive model was trained (e.g., using telemetry data or compressed telemetry data as input to the model).

In step 204, it is determined whether the global model is acceptable. The global model may be acceptable if the output of the global model has a predetermined quantity of error.

To make the determination, the output of the global model set may be compared to the actual values. For example, the telemetry data used as input to the compression model may be compared to the output of the decompression model. In another example, the output of the predictive model may be compared to the actual condition of the data zone associated with the telemetry data used as input to the predictive model.

The comparison may be normalized to a numerical value by, for example, using an objective function. Other methods of computing a numerical value representing the accuracy of the global model set may be used without departing from the invention.

In one or more embodiments of the invention, the determination is made by comparing the numerical value representing the accuracy of the global model set to a predetermined threshold. If the accuracy is less than a predetermined threshold, it may be determined that the global model output is unacceptable.

If it is determined that the global model output is unacceptable, the method may proceed to step 206. If it is determined that the global model output is acceptable, the method may proceed to step 202. In other words, the global model output of the global model set may be determined as being acceptable and may continue to be used for future predictive functionality. Specifically, the compression model of the global model set may be used to compress telemetry data so that it may be computationally efficiently provided to a global data manager.

In step 206, test telemetry data is obtained. The test telemetry data may reflect telemetry data of the data zone during a predetermined period of time. The test telemetry data may be obtained by, for example, reading it from storage, measuring it over the predetermined period of time, etc.

The test telemetry data may include (i) data usable as input to the global model set and (ii) a condition of the data zone associated with the data. For example, the data may reflect one or more characteristics of the data zone over a first period of time. The condition of the data zone associated with the data may be, for example, one or more characteristics of the data zone over a second period of time (e.g., a future period of time with respect to the first period of time).

In step 208, a local model set is obtained using the test telemetry data. The local model set may include (i) a local prediction model and (ii) a local compression model. The local model set may be obtained by training untrained models using the test telemetry data as input (e.g., training data if the untrained models are implemented as machine learning models).

The local prediction model and local compression model may only be trained using telemetry data obtained from the data zone that is generating the local model set. In other words, the predictive behavior of the local model set may be optimized for only those relationships identified from the operation of the data zone that generates the local model set. Thus, use of the local model set by other data zones should be considered suspect because it was not optimized for relationships present in other data zones.

In addition to a local prediction model and local compression model, the local model set may also include a local decompression model. The local decompression model may be similar to that discussed with respect to the global model set.

The local model set may be obtained in a manner similar to that of the global model set. However, rather than using telemetry data obtained from multiple data zones for training purposes, only data obtained from the data zone generating the local model set may be used to train the local model set.

In step 210, the global performance of the local model set is evaluated. The global performance of the local model set may reflect the predictive capability of the local model set when used to generate predictions based on telemetry data from one or more other data zones.

To evaluate the global performance of the local model set, the local model set may be provided to a global prediction manager. The global prediction manager may perform a process similar to that as described with respect to steps 202 and 204. However, data from other data zones may be used, at least in part, as the input for obtaining global model output. For additional details regarding evaluating the global performance of the local model set, refer to FIG. 3.

In step 212, it is determined whether the local model set is acceptable. The local model set may be determined as being acceptable if the local model set provides higher accuracy predictions when compared to the predictions generated by the global model set. In other words, whether the new model is more accurate than the currently used mode. A process of comparing numerical representations of the predictions generated by these models may be used to make the determined, similar to that described with respect to step 204.

If it is determined that the local model set is acceptable, the method may proceed to step 214. If it is determined that the local model set is unacceptable, the method may return to step 206. In other words, another local model set may be generated using different test telemetry data.

In step 214, the local model set is used as a global model set to provide telemetry data to a global prediction manager. To do so, the compression model may be used to compress telemetry data that will be used by the global prediction manager to generate a prediction.

The method may end following step 214.

Using the method illustrated in FIG. 2, a system in accordance with embodiments of the invention may reduce the computational cost for (i) determining whether model sets are acceptable and (ii) generating model sets. For example, by performing the aforementioned process using local telemetry data, the computational cost for aggregating telemetry data from multiple data zones may be avoided when compared to performing the aforementioned methods at, for example, a global prediction manager.

Figure 3:
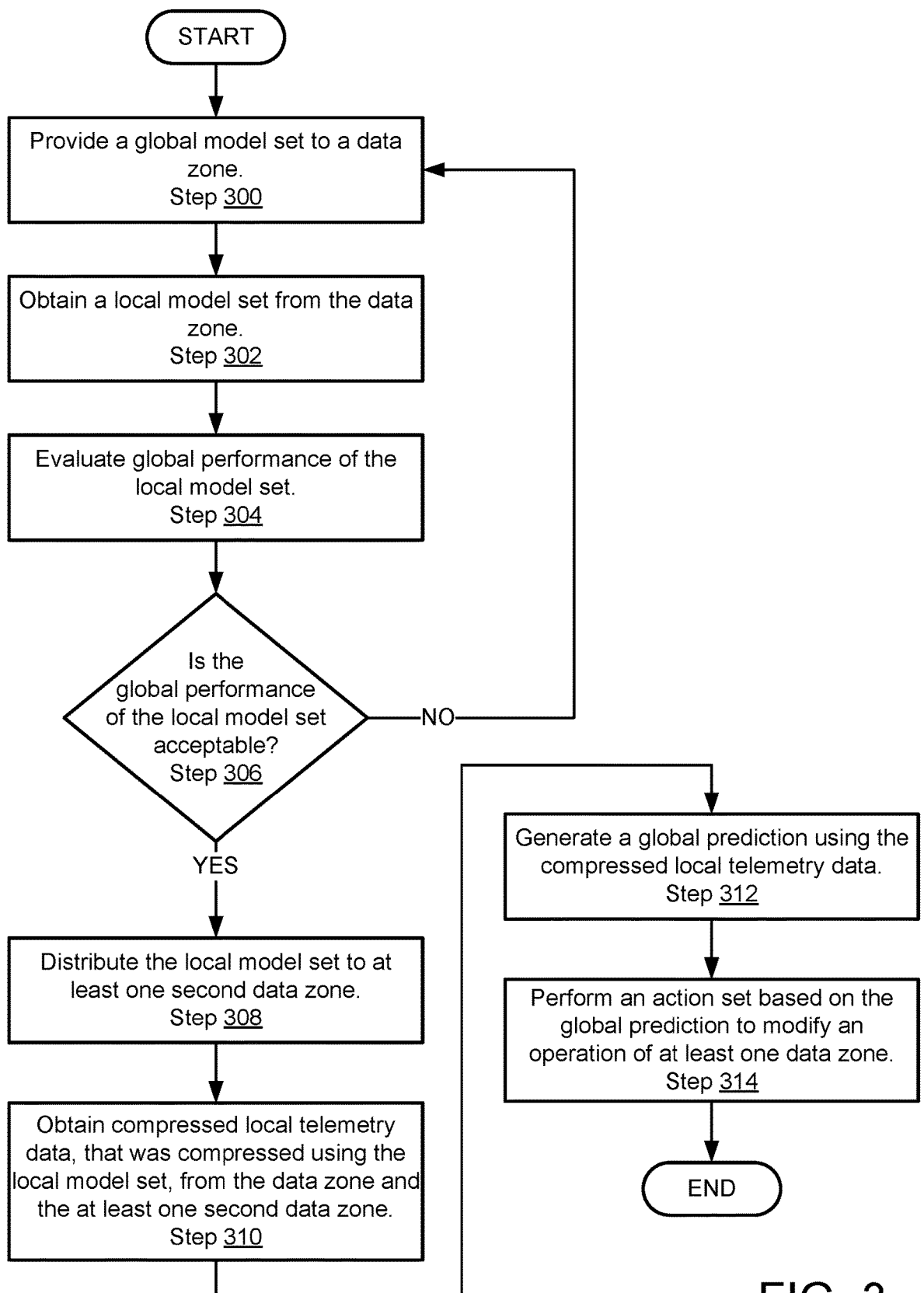
FIG. 3 shows a flowchart of a method of managing data zones in accordance with one or more embodiments of the invention.

Returning to FIG. 1.1, global prediction manager may manage data zones by predicting their likely future behavior (e.g., usage of limited computational resources such as storage) to identify whether the data zones will be unable to provide their computer implemented services. FIG. 3 illustrates a method that may be performed by the global prediction manager of the system of FIG. 1.1 to manage data zones.

FIG. 3 shows a flowchart of a method in accordance with one or more embodiments of the invention. The method depicted in FIG. 3 may be used manage data zones in accordance with one or more embodiments of the invention. The method shown in FIG. 3 may be performed by, for example, a global prediction manager (e.g., 110, FIG. 1.1). Other components of the system illustrated in FIG. 1.1 may perform all, or a portion, of the method of FIG. 3 without departing from the invention.

While FIG. 3 is illustrated as a series of steps, any of the steps may be omitted, performed in a different order, additional steps may be included, and/or any or all of the steps may be performed in a parallel and/or partially overlapping manner without departing from the invention.

In step 300, a global model set is provided to a data zone. The global model set may include (i) a compression model, (ii) a decompression model, and/or (iii) a predictive model. A three models may be trained when provided to the data zone to provide respective outputs using telemetry data.

In step 302, a local model set is obtained from the data zone. Obtaining the local model set may indicate that the data zone has determined that the global model set generates inaccurate predictions and/or introduces an unacceptable amount of error in compressed data.

The local model set may include trained models, similar to that of the global model set. However, the local model set may have only been trained using telemetry data from the data zone (and/or a subset of the data zones that the global prediction manager manages). Thus, the local model set may not have been optimized to generate predictions for all of the data zones that the global prediction manager manages.

In step 304, the global performance of the local model set is evaluated. The global performance of the local model set may be evaluated similar to that described with respect to FIG. 2. For example, the local model set may be used to generate output based on telemetry data from data zones that did not participate in the generation of the local model set. The generated output (e.g., predictions, compressed data, decompressed data) may be compared to corresponding actual quantities (e.g., the actual operating condition of the data zones, the test telemetry data used as input to the local model set).

The global performance of the local model set may be evaluated by computing a numerical score for the predictions generated by the models of the local model set.

In step 306, it is determined whether the global performance of the local model set is acceptable. The determination may be made, for example, by comparing the numerical value representing the predictive capability of the local model set to a similar numerical value associated with the global model set. If the performance of the local model set compares favorably (e.g., superior to) to the performance of the global model set, it may be determined that the global performance of the local model set is acceptable.

If the global performance of the local model set is determined as being acceptable, the method may proceed to step 308. If the global performance of the local model set is determined as being unacceptable, the method may proceed to step 300. In other words, the local model set may be discarded and a global model set may be provided to the data zone.

For example, the global prediction manager may train a new global model set and provide the new global model set to the data zone. To train the new global model set, the telemetry data upon which the local prediction model is based may be used to train the new global model set.

While the determined in step 306 has been described as based on comparing the performance of the local model set to that of the global model set, other metrics may be used to make the determination. For example, the performance of the local model set may be compared to predetermined thresholds rather than to the performance of the global model set.

In step 308, the local model set is distributed to at least one second data zone. In other words, the local model set may be provided to any number of data zones other than the data zone that generated the local model set (e.g., because it has a copy of the local model set already).

For example, when the local model set is determined as being acceptable in step 306, the local model set may be promoted to a global model set. Consequently, it may be distributed to any number of data zones as the model set to be used when compressing data to be provided to the global prediction manager.

In step 310, compressed local telemetry data that was compressed using the local model set may be obtained from the data zone and the at least one second data zone. In other words, once the local model set is distributed, the data zones may begin utilizing the local model set to compress and provide data to the global prediction manager for prediction generation purposes.

In step 312, a global prediction is generated using the compressed local telemetry data.

In one or more embodiments of the invention, the compressed local telemetry data is used as input to the predictive model of the local model set. The predictive model may then generate the global prediction based on the compressed local telemetry data.

In one or more embodiments of the invention, the compressed local telemetry data is decompressed using the decompression model of the local model set. The decompressed local telemetry data may be used as input to the predictive model of the local model set. The predictive model may then generate the global prediction based on the decompressed local telemetry data.

In step 314, an action set based on the global prediction is performed to modify an operation of at least one data zone.

In one or more embodiments of the invention, the action set includes identifying a change in operation to be implemented by a data zone and applying the change to the data zone. For example, the manner of operation of one or more components of the data zone may be modified. To do so, instructions reflecting the change in manner of operation may be provided to the data zone. The data zone may implement the change in operation of the one or more components thereby improving the operation of the data zone and/or improving the likelihood that the data zone will be able to provide computer implemented services in a desirable manner in the future.

The action set may also include notifying an administrator of the data zone that the data zone is likely to provide lower quality computer implemented services in the future. For example, an electronic communication may be sent to the administrator indicating that, for example, the storage of the data zone may not be able to provide sufficient quality of storage services to meet an upcoming demand that will be placed on the storage system of the data zone.

The method may end following step 314.

Using the method illustrated in FIG. 3, a global prediction manager may be better able to manage data zones by more accurately predicting the future performance and/or needs of the data zones. For example, by distributing the testing and model set generation demands across the system, the system may be better able to marshal its limited computational resources by reducing the need to transmit data between different portions of the system.

To further clarify embodiments of the invention, a non-limiting example is provided in FIGS. 4.1-4.3. FIG. 3 shows a diagram of an example system similar to that of FIG. 1.1. FIGS. 4.2-4.3 illustrate interactions between components and/or actions performed by the components of the system of FIG. 4.1 over time. For the sake of brevity, only a limited number of components of the system of FIG. 1.1 are illustrated in each of FIGS. 4.1-4.3.

Example

Consider a scenario as illustrated in FIG. 4.1 in which a global prediction manager (404) is managing two data zones (e.g., 400, 402). At the point in time illustrated in FIG. 4.1, both of the data zones may be providing database services to clients. The databases of both data zones may include similar information and each of the data zones may be providing database services to similar numbers of client.

Turning to FIGS. 4.2-4.3, the aforementioned figures illustrate interactions and actions between components of the system of FIG. 4.1. In these figures, the relative occurrence in time of the interactions progresses from the top of each figure (i.e., earlier in time) to the bottom of each figure (i.e., later in time). FIG. 4.3 is a continuation of the diagram of FIG. 4.2. In other words, element 410 indicates the first interaction that occurs in time while element 430 indicates the last interaction that occurs.

To facilitate management of the first data zone (400), the global prediction manager (4040) provides a global model set (410) to the first data zone (400). Though not illustrated in FIG. 4.2, the global prediction manager (404) provided a copy of the global model set to the second data zone (402) previously.

After obtaining the global model set (410), the first data zone (400) begins to provide compressed telemetry data (not shown) to the global prediction manager (404). Using the compressed telemetry data, the global prediction manager (404) generates and uses predictions to periodically modify the operation of the first data zone (400).

At a second point in time, the first data zone (400) determines that the global model set is inaccurate (412). After determining that the global model set is inaccurate, the first data zone (400) generates a local model set (414). The first data zone (400) provides a copy of the local model set (416) to the global prediction manager (404).

In response to obtaining the local model set (416), the global prediction manager (404) obtains telemetry data (420) from the second data zone (402). Using the second telemetry data (420), the global prediction manager (404) determines that the prediction by the local model set is accurate (422) when using the telemetry data (420) as input. Consequently, the global prediction manager (404) determines that the local model set generated by the first data zone (400) should be used by both of the data zones (400, 402). Accordingly, the global prediction manager (404) provides the local model set (424) to the second data zone (402) for its use.

After being provided the local model set (424), the second data zone (402) uses the local model set to obtain compressed telemetry data (426). The second data zone (402) provides the local model set compressed telemetry data (426) to the global prediction manager. Similarly, the first data zone (400) provides its local model compressed telemetry data (428) to the global prediction manager.

Using the aforementioned compressed telemetry data (428), the global prediction manager (404) obtains a global prediction (430) of the future operating conditions of the data zones (400, 402). Consequently, the global prediction manager (404) is able to manage the data zones (e.g., modifying their operations to address the future operating conditions) in a manner that enables them to better able provide computer implemented services.

End of Example

Any of the components of FIG. 1.1 may be implemented using distributed computing devices. As used herein, a distributed computing device refers to functionality provided by a logical device that utilizes the computing resources of one or more separate and/or distinct computing devices.

Figure 5:
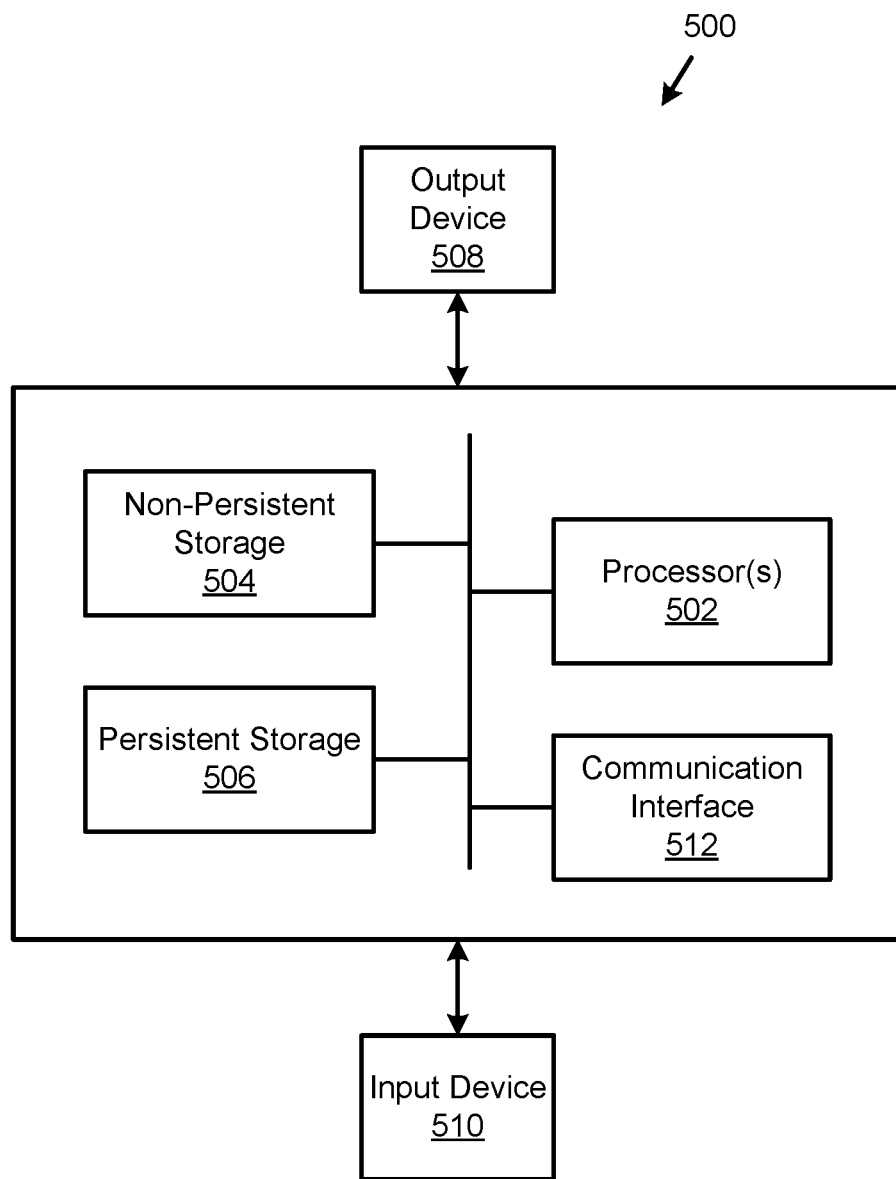
FIG. 5 shows a diagram of a computing device in accordance with one or more embodiments of the invention.

As discussed above, embodiments of the invention may be implemented using computing devices. FIG. 5 shows a diagram of a computing device in accordance with one or more embodiments of the invention. The computing device (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), input devices (510), output devices (508), and numerous other elements (not shown) and functionalities. Each of these components is described below.

In one embodiment of the invention, the computer processor(s) (502) may be an integrated circuit for processing instructions. For example, the computer processor(s) may be one or more cores or micro-cores of a processor. The computing device (500) may also include one or more input devices (510), such as a touchscreen, keyboard, mouse, microphone, touchpad, electronic pen, or any other type of input device. Further, the communication interface (512) may include an integrated circuit for connecting the computing device (500) to a network (not shown) (e.g., a local area network (LAN), a wide area network (WAN) such as the Internet, mobile network, or any other type of network) and/or to another device, such as another computing device.

In one embodiment of the invention, the computing device (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing devices exist, and the aforementioned input and output device(s) may take other forms.

Embodiments of the invention may provide a method and system for managing data zones by predicting their future operating conditions. To do so, the system may implement a disaggregated method of determining the accuracy of the predictions generated by prediction models used by the system. The disaggregated method enables the accuracy of the predictions to be ascertained by only using local data. Consequently, transmission of large amounts of data for prediction model accuracy checking purposes. By doing so, the system may be better able to provide computer implemented services by avoiding transmission of large amounts of data between portions of the system that are remote to each other.

Similarly, a system in accordance with embodiments of the invention may utilize a disaggregated method of generating predictive models. Rather than aggregating large amount of data used to generated predictive models in a centralized location, the system may selectively generate models using only local data. The accuracy of the generated models may then be evaluated, as discussed above, in a computationally efficient manner. Thus, the computational cost for generating and validating models may be reduced when compared to methods of generating predictive models that rely on data form multiple, remote portions of a system.

Thus, embodiments of the invention may address the problem of limited computational resources in a distributed system. Specifically, embodiments of the invention may reduce the need to transmit data within the system for (i) model accuracy checking purposes and (ii) model generation purposes. Consequently, a system in accordance with embodiments of the invention may be able to shift computing resources that would be otherwise used for model generation/validation purposes to provide computer implemented services valued by clients.

The problems discussed above should be understood as being examples of problems solved by embodiments of the invention disclosed herein and the invention should not be limited to solving the same/similar problems. The disclosed invention is broadly applicable to address a range of problems beyond those discussed herein.

One or more embodiments of the invention may be implemented using instructions executed by one or more processors of the data management device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A global prediction manager for generating predictions using data from data zones, comprising:
  storage for storing a model repository comprising a global model set, wherein the global model set comprises a global prediction model and a global compression model; and
  a prediction manager programmed to:
    obtain a local model set from a data zone of the data zones indicating that the global model set is unacceptable, wherein the data zone determines, based on a predetermined threshold, that the global model set is unacceptable, wherein the data zone comprises a plurality of computing devices that provides computer implemented services to a client, wherein the local model set comprises a local prediction model and a local compression model;
    based on the indication specifying that the global model set is unacceptable, obtain local telemetry data from a second data zone of the data zones, wherein the local telemetry data corresponds to a previous quality of computer implemented services provided by the second data zone;
make a determination, using the local telemetry data, that a prediction performed by the local model set is acceptable;
in response to the determination:
distribute the local model set to the second data zone;
obtain compressed local telemetry data from the second data zone and second compressed local telemetry data from the data zone, wherein the data zone and the second data zone compress telemetry data using the local compression model, wherein the local compression model is a lossy compression model; and
generate a global prediction regarding a future operating condition of the data zone and the second data zone to predict a future quality of the computer implemented services provided by the data zone and the second data zone using:
the compressed local telemetry data,
the second compressed local telemetry data, and
the local model set.

2. The global prediction manager of claim 1, wherein the prediction manager is further programmed to:
modify an operation of the data zones based on the global prediction.

3. The global prediction manager of claim 1, wherein the local prediction model is trained on only second local telemetry data of the data zone.

4. The global prediction manager of claim 3, wherein the global prediction model is trained on both the second local telemetry data of the data zone and the local telemetry data of the second data zone.

5. The global prediction manager of claim 1, wherein making the determination that the local model set is acceptable further comprises:
obtaining an operating condition associated with the local telemetry data;
obtaining a local prediction of the operating condition using:
the local model set, and
the local telemetry data;
obtaining the compressed second local telemetry data using:
the local model set, and
the local telemetry data;
obtaining decompressed local telemetry data using the compressed local telemetry data;
making the determination by analyzing:
the local telemetry data,
the decompressed local telemetry data,
the operating condition, and
the local prediction of the operating condition.

6. The global prediction manager of claim 1, wherein the local compression model is trained on only second local telemetry data of the data zone.

7. The global prediction manager of claim 6, wherein the global compression model is trained on both the second local telemetry data of the data zone and the local telemetry data of the second data zone.

8. A method for generating predictions using data from data zones, comprising:
obtaining a local model set from a data zone of the data zones indicating that a global model set using to generate the predictions is unacceptable, wherein the data zone determines, based on a predetermined threshold, that the global model set is unacceptable, wherein the data zone comprises a plurality of computing devices that provides computer implemented services to a client, wherein the local model set comprises a local prediction model and a local compression model, wherein the global set model comprises a global prediction model and a global compression model;
based on the indication specifying that the global model set is unacceptable, obtain local telemetry data from a second data zone of the data zones, wherein the local telemetry data corresponds to a previous quality of computer implemented services provided by the second data zone;
making a determination, using the local telemetry data, that a prediction performed by the local model set is acceptable;
in response to the determination:
distributing the local model set to the second data zone;
obtaining compressed local telemetry data from the second data zone and second compressed local telemetry data from the data zone, wherein the data zone and the second data zone compress telemetry data using the local compression model, wherein the local compression model is a lossy compression model; and
generating a global prediction regarding a future operating condition of the data zone and the second data zone to predict a future quality of the computer implemented services provided by the data zone and the second data zone using:
the compressed local telemetry data,
the second compressed local telemetry data, and
the local model set.

9. The method of claim 8, further comprising:
modifying an operation of the data zones based on the global prediction.

10. The method of claim 8, wherein the local prediction model is trained on only second local telemetry data of the data zone.

11. The method of claim 10, wherein the global prediction model is trained on both the second local telemetry data of the data zone and the local telemetry data of the second data zone.

12. The method of claim 8, wherein making the determination that the local model set is acceptable further comprises:
obtaining an operating condition associated with the local telemetry data;
obtaining a local prediction of the operating condition using:
the local model set, and
the local telemetry data;
obtaining the compressed local telemetry data using:
the local model set, and
the local telemetry data;
obtaining decompressed local telemetry data using the compressed local telemetry data;
making the determination by analyzing:
the local telemetry data,
the decompressed local telemetry data,
the operating condition, and
the local prediction of the operating condition.

13. The method of claim 8, wherein the local compression model is trained on only second local telemetry data of the data zone.

14. The method of claim 13, wherein the global compression model is trained on both the second local telemetry data of the data zone and the local telemetry data of the second data zone.

15. A non-transitory computer readable medium comprising computer readable program code, which when executed by a computer processor enables the computer processor to perform a method for generating predictions using data from data zones, the method comprising:
obtaining a local model set from a data zone of the data zones indicating that a global model set using to generate the predictions is unacceptable, wherein the data zone determines, based on a predetermined threshold, that the global model set is unacceptable, wherein the data zone comprises a plurality of computing devices that provides computer implemented services to a client, wherein the local model set comprises a local prediction model and a local compression model, wherein the global set model comprises a global prediction model and a global compression model;
based on the indication specifying that the global model set is unacceptable, obtain local telemetry data from a second data zone of the data zones, wherein the local telemetry data corresponds to a previous quality of computer implemented services provided by the second data zone;
making a determination, using the local telemetry data, that a prediction performed by the local model set is acceptable;
in response to the determination:
distributing the local model set to the second data zone;
obtaining compressed local telemetry data from the second data zone and second compressed local telemetry data from the data zone, wherein the data zone and the second data zone compress telemetry data using the local compression model, wherein the local compression model is a lossy compression model; and
generating a global prediction regarding a future operating condition of the data zone and the second data zone to predict a future quality of the computer implemented services provided by the data zone and the second data zone using:
the compressed local telemetry data,
the second compressed local telemetry data, and
the local model set.

16. The non-transitory computer readable medium of claim 15, wherein the method further comprises:
modifying an operation of the data zones based on the global prediction.

17. The non-transitory computer readable medium of claim 15, wherein the local prediction model is trained on only second local telemetry data of the data zone.

18. The non-transitory computer readable medium of claim 17, wherein the global prediction model is trained on both the second local telemetry data of the data zone and the second local telemetry data of the at least one second data zone.

19. The non-transitory computer readable medium of claim 15, wherein making the determination that the local model set is acceptable further comprises:
obtaining an operating condition associated with the local telemetry data;
obtaining a local prediction of the operating condition using:
the local model set, and
the local telemetry data;
obtaining the compressed local telemetry data using:
the local model set, and
the local telemetry data;
obtaining decompressed local telemetry data using the compressed local telemetry data;
making the determination by analyzing:
the local telemetry data,
the decompressed local telemetry data,
the operating condition, and
the local prediction of the operating condition.

20. The non-transitory computer readable medium of claim 15, wherein the local compression model is trained on only second local telemetry data of the data zone.

* * * * *

UNITED STATES PATENT AND TRADEMARK OFFICE
CERTIFICATE OF CORRECTION

PATENT NO. : 11,625,616 B2
APPLICATION NO. : 16/859746
DATED : April 11, 2023
INVENTOR(S) : Paulo Abelha Ferreira et al.

It is certified that error appears in the above-identified patent and that said Letters Patent is hereby corrected as shown below:

In the Claims

Claim 5, Column 21, Line 44, the phrase "obtaining the compressed second local telemetry data" should instead read -- obtaining the compressed local telemetry data --.

Claim 18, Column 24, Line 16, the phrase "second local telemetry data of the at least one second data" should instead read -- local telemetry data of the second data --.

Signed and Sealed this
Twenty-third Day of May, 2023

Katherine Kelly Vidal
*Director of the United States Patent and Trademark Office*